United States Patent [19]

Harrison et al.

[11] Patent Number: 4,683,922
[45] Date of Patent: Aug. 4, 1987

[54] PARTICLE DEFLECTOR AND METHOD OF DISTRIBUTING DISSIMILAR PARTICLES

[75] Inventors: David M. Harrison, Chester; Robert P. Gentili, Richmond; George N. Bellucci, Hopewell, all of Va.

[73] Assignee: Allied Corporation, Morris Township, Morris County, N.J.

[21] Appl. No.: 822,345

[22] Filed: Jan. 24, 1986

[51] Int. Cl.⁴ ............................................. B65B 1/04
[52] U.S. Cl. ..................................... 141/9; 141/100; 141/286; 118/303; 239/505; 414/293
[58] Field of Search ...................................... 141/1–12, 141/250–284, 285–310, 100–110; 414/293; 239/505, 524, 666; 118/303, 308

[56] References Cited

U.S. PATENT DOCUMENTS 4,049,028 9/1977 Harris et al. ..................... 141/286
4,081,004 3/1978 Harris ............................. 141/286

Primary Examiner—Houston S. Bell, Jr.
Attorney, Agent, or Firm—Richard A. Negin; Patrick L. Henry

[57] ABSTRACT

A particle deflector located between a particle feed stream of dissimilar particles and a collection receptacle. The deflector has a deflector surface facing the on coming particle feed stream. The particles are deflected by the surface and are collected in the receptacle. The surface defined by the collected particles is substantially flat and the dissimilar particles do not segregate.

12 Claims, 3 Drawing Figures

PARTICLE DEFLECTOR AND METHOD OF DISTRIBUTING DISSIMILAR PARTICLES

BACKGROUND OF THE INVENTION

This invention is in the field of material handling; more particularly, the invention relates to an apparatus useful for distributing a stream containing a mixture of at least two types of dissimilar particles and a method of distributing dissimilar particles.

Material handling operations often involve the transport of streams containing at least two types of dissimilar particles. Typical of operations in which this occurs are streams containing plastic pellets of various types. Often there is a major or base material to which minor amounts of pellets containing additives are mixed. The mixture is sent to be packed in a suitable container such as a bin or a bag. Typical bins are rectangular boxes of a size suitable for transport.

Although the stream contains a desired mixture distribution, usually a uniform mixture, particle segregation of the dissimilar particles has been found to occur during the filling of the containers. The reasons for the particle segregation differ with the differing properties of the dissimilar material. Typical differences which cause segregation of particles are differences in density, particle geometry, coefficient of friction of particle surfaces, electrical conductivity/static electricity properties. When the stream is fed into a receptacle, segregation often occurs as the components impact and roll down the top layers of the material already located in the receptacle. Typically, the material has been found to build up in containers in a conical configuration. As new material is received from the mixture stream, it first encounters the high point of the cone and particle segregation occurs as the material rolls down the sides of the cone. Dissimilar properties result in materials segregating.

In order to avoid particle segregation by reason of the cone forming, it is known in the art to interpose a motorized, spinning disc having its major plane generally paralleled to the longitudinal axis of the particle stream.

SUMMARY OF THE INVENTION

The present invention is an apparatus useful for distributing dissimilar particles and a corresponding method of distributing dissimilar particles. The apparatus comprises a particle outlet having a longitudinal axis and a deflector generally coaxial with the longitudinal axis of the particle outlet interposed between the particle outlet and a receptacle for collecting the dissimilar particles. The deflector has a deflector surface facing the outlet. The distance of a point on the deflector surface from the axis increases with the distance of the point from the outlet. Typical of such deflecting surfaces are surfaces of revolution about the longitudinal axis where the surface of revolution is formed by revolution of the arc of a circle. Another surface of revolution is that formed by a cone. The surface does not necessarily have to be a surface of revolution and may be a pyramid type surface or faceted surface having a plurality of sides. The whole deflector can be a surface of revolution such as a sphere. Preferably, the deflector is an enclosed surface. The deflecting surface has an "effective diameter" which is the diameter of a circle having a radius equal to the distance from the axis to the greatest distance from the axis of a point on the deflector surface. The deflector is located at a distance from the outlet where the closest point on the deflector to the outlet is at least one-quarter of the effective diameter. The outlet should have an area of about one-quarter to about four times the area of a circle having an effective diameter of the deflector.

The present invention includes a method of distributing dissimilar particles comprising a step of feeding a stream of a mixture of at least two types of dissimilar particles, the stream flowing generally about a longitudinal axis parallel to the direction of the stream. The method includes deflecting the particles in the stream with a deflector located between the stream of particles and a receptacle means used to collect the particles. The deflector used in the method is of the type described above. The receptacle has a cross-sectional area, in a plane perpendicular to the axis of the particle stream, which is greater than the area of a circle having an effective diameter of the deflector. The cross-sectional area of the receptacle is preferably at least 10 times and more preferably from 10 to 500 and most preferably 100 to 200 times the area of a circle having an effective diameter.

The apparatus and method of the present invention result in the particles collecting in the receptacle so that the upper surface defined by the particles in the receptacle is generally flat rather than conical as is typically the case where the deflector of the present invention is not used.

DESCRIPTION OF THE PREFERRED EMBODIMENTS

Figure 1:
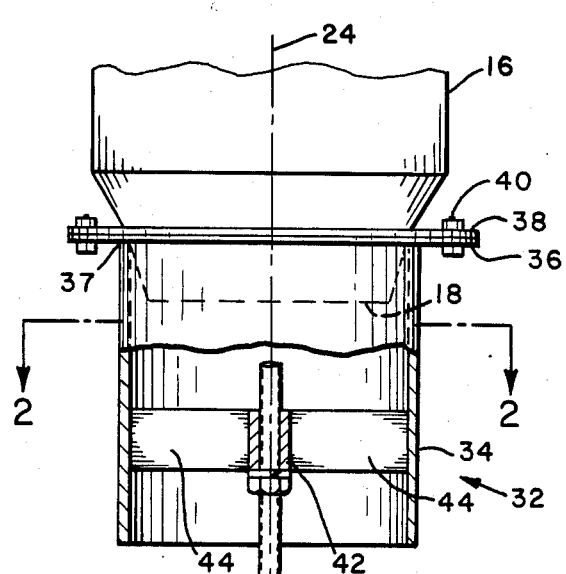
FIG. 1 is a partial cross-section schematic drawing showing one embodiment of the deflector of the present invention.
Figure 2:
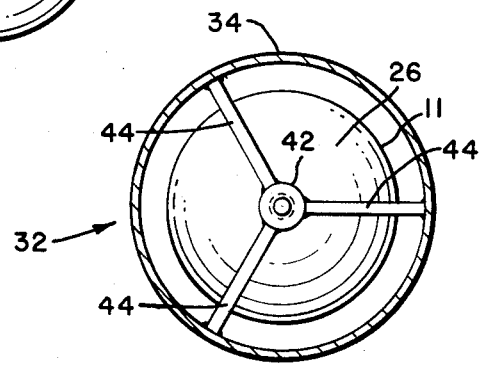
FIG. 2 is a section along line 2—2 of FIG. 1.
Figure 3:
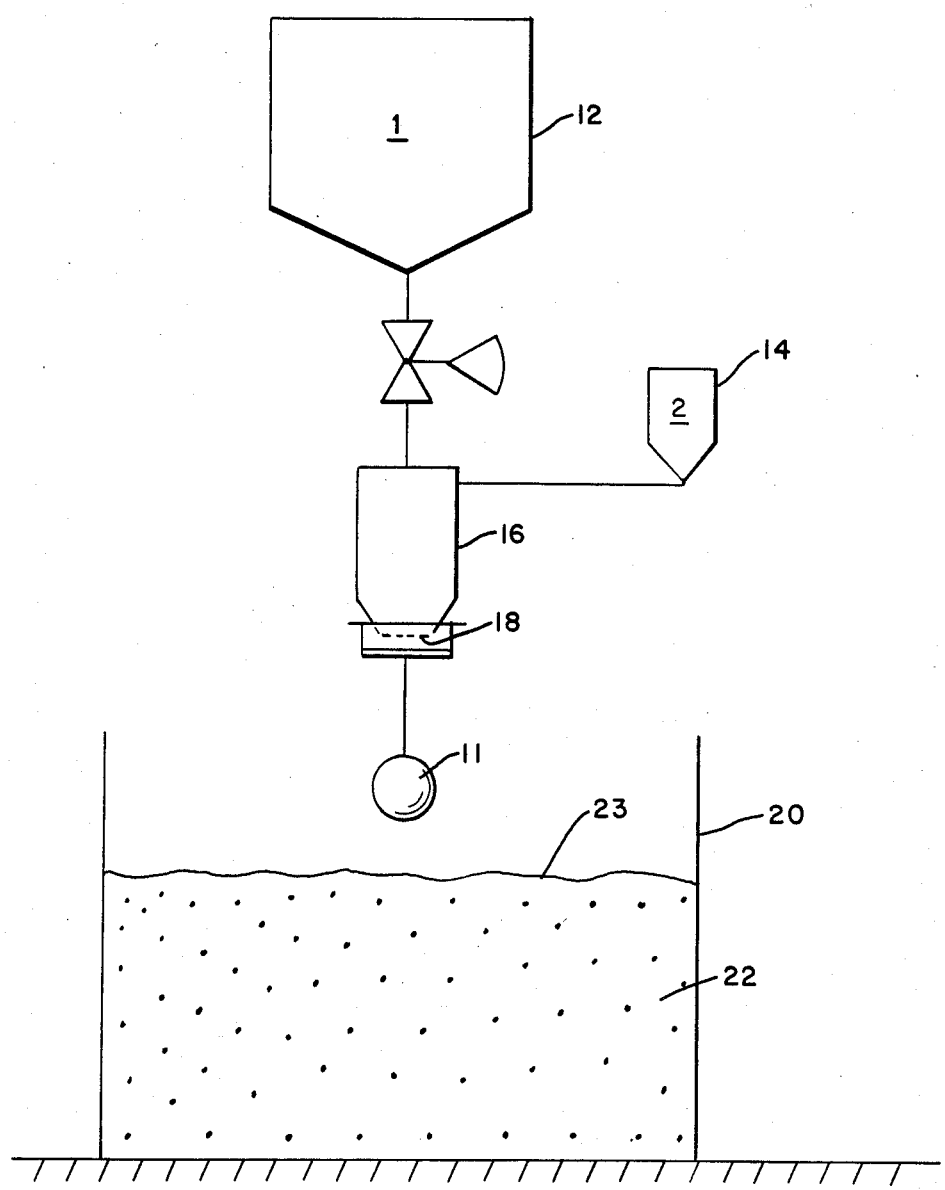
FIG. 3 is a schematic assembly drawing of the present invention.

The present invention will be understood by those skilled in the art by reference to FIGS. 1-3 which show one embodiment of the present invention in FIGS. 1 and 2 and this embodiment installed in FIG. 3.

The present invention is used to ensure that a stream containing a mixture of at least two types of dissimilar particles is collected in a receptacle so that the upper surface defined by the particles in the collecting receptacle is substantially flat rather than forming a cone under the particle stream. One of the advantages of the present invention is the use of the above-described apparatus which is a static apparatus involving no moving parts.

The present invention is generally shown as deflector 11. It is part of a material handling unit generally shown in FIG. 3 for mixing dissimilar particles and collecting them in a receptacle. The material handling unit shown in FIG. 3 is useful to handle a physical mixture of pellets of a base resin or polymer and additives which can be composed of dissimilar pellets as well. Material 1 or the base material is fed from storage bin 12. Material 2 is a second dissimilar material such as an additive material fed from storage bin 14. The volume of materials fed from bin 12 and bin 14 as well as the relative amounts of materials from bin 12 and bin 14 can be controlled by suitable means known in the art. Typically, material 1 can be gravity fed from bin 12. A typical way to add a small amount of additive material 2 is to gravity feed or screw feed material 2 from bin 14.

Material 1 and material 2 from bins 12 and 14 are fed into a suitable mixing means such as static mixer 16. Such static mixers are well-known to those skilled in the art, and typically contain circuitous paths defined by fins and other obstructions which result in the materials passing through the static mixer intermingling to result in a uniform mixture. The material exits the static mixer 16 from static mixer outlet 18 and passes to deflector 11. The material is deflected by deflector 11 and passes into receptacle 20. The mixture of dissimilar material 22 is shown in receptacle 20. Material surface 23 defined by the surface formed by the top of the material is substantially flat and does not have a characteristic conical shape typically present when gravity feeding a stream of particular material.

The apparatus of the present invention can be understood by a review of the specific embodiment shown in FIGS. 1 and 2. In this embodiment, the mixture of dissimilar material is shown coming from outlet 18 of static mixer 16. The outlet has a longitudinal axis 4. This is generally defined by the longitudinal axis of static mixer 16. The longitudinal axis where the dissimilar material is gravity fed to the deflector 11, is a vertical line which is substantially perpendicular to the opening of outlet 18 and which is substantially centered in the outlet opening.

The deflector 11 has a deflector surface 26 facing the outlet. In FIG. 1, where the deflector is a sphere the deflector surface 26 is a hemisphere facing outlet 18. In this particular embodiment, the deflector is a full sphere which is fully enclosed.

A means to connect the deflector 11 to the outlet 18 is illustrated in FIGS. 1 and 2. The means to secure the deflector 11 in place is a rod 28 connected to deflector 11. The rod is connected to the deflector by suitable means known in the art. A preferred way to connect rod 28 to deflector 11 is by using a threaded rod and threading it through a threaded opening 29 in deflector 11. In alternate embodiments, the rod may additionally be threaded through the opposite side of deflector 11, or welded into place. The deflector 11 is substantially coaxial with rod 28. Rod 28 is connected to the outlet 18 by any suitable connecting means to maintain rod 28 coaxial to outlet longitudinal axis 24 with deflector surface 26 facing outlet 18. The specific deflector connector 32 shown in FIGS. 1 and 2 has a cylindrical pipe 34. The pipe has a pipe flange 36 circumferentially connected to the outlet end 37 of pipe 34. The flange is typically in a plane perpendicular to the longitudinal axis of the pipe. Static mixer 16 has a corresponding mixer flange 38. Pipe flange 36 and the mixer flange 38 provide one way to connect pipe 34 to mixer 16 at the outlet 18 of the mixer. Suitable connecting means such as nuts 40 can be used to secure the connection of flanges 36 and 38. There is a means within the pipe to connect rod 28 to the pipe 34 coaxially with longitudinal axis 24. In the embodiments shown in FIGS. 1 and 2, this means is a cylinder coaxial with outlet coaxial axis 24 and having a longitudinal hole through which rod 28 passes. There is a suitable means to connect rod 28 in place within the hole in cylinder 42. The preferred means is to thread the hole in cylinder 42 and screw a threaded rod 28 into place. Alternately, rod 28 can be welded within the hole in cylinder 42. Cylinder 42 is suitably connected to pipe 34 so that the hole within cylinder 42 is coaxial with outlet longitudinal axis 24. This can be accomplished by at least one securing bar 44 leading from the inner wall of pipe 34 to cylinder 42. In a preferred embodiment, there are three securing bars 44 placed equal distance from each other as shown in FIGS. 1 and 2. The bars are connected to pipe 34 and to the outer surface of cylinder 42 by suitable means. Preferably, the bars are welded into place.

Deflector surface 26 as shown in the FIG. 1 and 2 is a hemisphere. More generally, the deflector surface 26 which faces outlet 18 is a surface having a shape so that the distance of a point on the surface from the axis 24 increases with the distance of the point from outlet 18. The deflecting surface 26 has an effective diameter which is the diameter of the circle having a radius equal to the distance from the axis 24 to the greatest distance from the axis of a point on the deflector surface 26. For the embodiment shown in FIG. 1, the effective diameter is the diameter of the sphere. The deflector 26 is located at a distance from the outlet 18 where the closest point 46 on the deflector 26 to the outlet 18 is at least one-quarter of the effective diameter. It has been found that for the deflector 11 to be effective in distributing dissimilar particles by avoiding the conical formation and attendant segregation of particles, the outlet 18 should have an area from about ¼ to about 4 times the area of a circle having an effective diameter.

The deflector 11 of the present invention can have a variety of shapes so long as the above-criteria regarding the surface is met. Preferably, the surface is a surface of revolution about the longitudinal axis 24. A preferred embodiment is where the surface of revolution is the surface formed by revolution of the arc of a circle. The embodiment shown in the figures is this type where the deflector surface 26 is formed by the revolution of a 90° arc to form a hemisphere. In alternate embodiments, the surface of revolution can be a cone. The deflector of the present invention does not have to be a surface of revolution but can be a multi-sided surface such as a pyramid or multi-faceted surface. Preferably, the deflector is made of an enclosed surface. The most preferred embodiment is the sphere shown as deflector 11.

A preferred embodiment of the present invention useful for distributing dissimilar plastic particles is a spherical deflector of the type shown in FIGS. 1–3 wherein outlet 18 is between 3½ and 4½ inches in diameter and the sphere is between 3 and 5 inches in diameter. The closest point on the sphere to the opening is located between 3 and 9 inches from the outlet opening.

The present invention includes a method of distributing a mixture of dissimilar particles. The method of the present invention will be described with respect to the apparatus described above and is shown in FIGS. 1–3. The method generally comprises distributing a mixture of dissimilar particles by feeding a stream containing a mixture of at least two types of dissimilar particles. The stream flow generally defines a longitudinal axis parallel to direction of flow. Such a longitudinal axis is illustrated by outlet longitudinal axis 24.

The stream of particles is deflected with a deflector 11 located between the stream of particles and a receptacle means used to collect the particles. The deflector is of the type described above. The deflected particles are collected in a walled receptacle. The cross-sectional area of the receptacle in a plane perpendicular to the axis of the particle stream should be greater than the area of a circle having an effective diameter of the deflector. The cross-sectional area of the receptacle is preferably at least 10 times and more preferably from 10 to 500 and most preferably 100 to 200 times the area of a circle having an effective diameter.

The mixture of dissimilar materials 22 within the receptacle is deposited whereby the surface 23 defined by the particles at the surface of the deposited particles is substantially flat in a plane generally perpendicular to the longitudinal axis of the original polymer stream or longitudinal axis of the outlet 24. The process thereby avoids the deposition of the particles in a manner which results in a cone formed coaxially beneath the particle stream. The elimination of this cone is advantageous since it helps to minimize segregation of dissimilar particles. Additionally, the method and apparatus of the present invention result in a relatively flat surface 23 which enables receptacles to be filled flat. This assures that the receptacles are fully filled and that the step of smoothing out the cone is eliminated. An advantage of the use of the deflector of present invention is that it is static, having no moving parts.

The deflector of the present invention can be made of suitable materials. Preferred materials for handling plastics and resins include stainless steel as well as aluminum. Depending on the properties and type of particles to be deflected, any suitable material including ceramic or glass-like material, polymeric material, metallic material, or the like can be used. The means to hold the deflector in position can be made of suitable materials as well. Typically, these will be made of stainless steel.

For a system which handles from 3,000 to 12,000 lbs./hr. of Material 1 and from 15 to 150 lbs./hr. of Material 2 where Materials 1 and 2 are cylindrical polymeric pellets being about 0.1 inches long by 0.1 inches in diameter, the deflector is preferably a stainless steel sphere between 2 and 6 inches in diameter and preferably 3 to 5 inches in diameter with the most preferred diameter being about 4 inches. The preferred means to maintain the deflector in place is also made of stainless steel and is of the type shown in FIGS. 1 and 2. The diameter of pipe 34 is from 3 to 6 inches, and preferably about 4 inches. The axial length of pipe 34 is from 3 to 6 inches and preferably 4 inches. The bars 44 can be located anywhere within the pipe, but are preferably opposite outlet end 37. Typically, the bars would be between 2 and 4 inches from outlet end 37. The rod 28 extends from 2 to 8 inches from threaded opening 29. Preferably, the rod extends approximately 5 inches. The distance from closest point 46 to outlet 18 is preferably from about 4 to 8 inches. This results in a distance from pipe 34 to closest point 46 of about 2 to 4 inches. It is recognized that one skilled in the art can vary the materials and sizes with a minimum of experimentation depending on the particular dissimilar materials and equipment used. The present invention can be used to distribute particles having average diameter of at least 0.025 inches. It is preferred to be used with particles from 0.025 to 2 inches in average diameter.

While exemplary embodiments of the invention have been described, the true scope of the invention is to be determined from the following claims.

What is claimed is:

1. An apparatus comprising:
   a particle outlet having a longitudinal axis;
   a deflector substantially coaxial with the longitudinal axis of the particle outlet, the deflector having a deflector surface facing the outlet, the distance of a point on the deflector surface from the axis increasing with the distance of the point from the outlet, the deflecting surface having an effective diameter which is the diameter of a circle having a radius equal to the greatest distance from the axis of a point on the deflector surface, the deflector being located at a distance from the outlet where the closest point on the deflector to the outlet is at least about one-quarter of the effective diameter, and the outlet having an area from about $\frac{1}{4}$ to about 4 times the area of a circle having an effective diameter.

2. The apparatus of claim 1 wherein the deflector surface is a surface of revolution about the longitudinal axis.

3. The apparatus of claim 2 wherein the surface of revolution is the surface formed by revolution of the arc of a circle.

4. The apparatus of claim 2 wherein the surface of revolution is a cone.

5. The apparatus of claim 1 wherein the deflector surface is a four-sided pyramid coaxial to the longitudinal axis.

6. The apparatus of claim 1 wherein the deflector is a surface of revolution.

7. The apparatus of claim 6 wherein the deflector is a sphere.

8. The apparatus of claim 1 wherein the deflector is an enclosed surface.

9. An apparatus comprising:
   a particle outlet having a longitudinal axis; and
   a spherical deflector coaxial with the longitudinal axis of the outlet and located at a distance from the outlet where the closest point on the deflector to the outlet is at least about one-quarter of the diameter of the sphere, and the outlet has an area about $\frac{1}{4}$ to about 4 times the area of a circle having the diameter of the sphere.

10. A method of distributing a mixture of dissimilar particles comprising the step of:
    feeding a stream containing a mixture of at least two types of dissimilar particles, the stream flowing substantially about a longitudinal axis parallel to the direction of the stream;
    deflecting the particles in the stream with a deflector located between the stream of particles and the receptacle with a deflector; the deflector being substantially coaxial with the longitudinal axis of the particle stream, the deflector having a deflector surface facing the oncoming stream, the distance of a point on the deflector surface from the axis increasing with the distance of the point from the outlet, the deflecting surface having an effective diameter which is the diameter of a circle having a radius equal to the greatest distance from the axis of a point on the deflector surface, and the cross-sectional area of the stream defining an area of from about $\frac{1}{4}$ to about 4 times the area of a circle having an effective diameter.

11. The method as recited in claim 10 further comprising the step of collecting the deflected particles in a walled receptacle, where the cross-sectional area of the receptacle in a plane perpendicular to the axis of the particle stream being greater than the area of a circle having an effective diameter.

12. A method of distributing a mixture of dissimilar particles comprising the step of:
    feeding a stream containing a mixture of at least two types of dissimilar particles from an outlet to a receptacle, the stream flowing generally about a longitudinal axis parallel to the direction of the stream;

deflecting the particles in the stream with a deflector located between the stream of particles and the receptacle;

the deflector generally coaxial with the longitudinal axis of the particle stream, the deflector having a deflector surface facing the oncoming stream, the distance of a point on the deflector surface from the axis increasing with the distance of the point from the outlet, the deflecting surface having an effective diameter which is the diameter of a circle having a radius equal to the greatest distance from the axis of a point on the deflector surface, and the cross-sectional area of the stream defining an area of from about $\frac{1}{4}$ to about 4 times the area of a circle having an effective diameter.

* * * * *